United States Patent
Park et al.

(10) Patent No.: US 7,158,568 B2
(45) Date of Patent: Jan. 2, 2007

(54) EQUALIZER/FORWARD ERROR CORRECTION AUTOMATIC MODE SELECTOR

(75) Inventors: Jeongsoon Park, Lafayette, IN (US); Seo Weon Heo, South Korea (KR); Markman Ivonete, Carmel, IN (US); Saul Brian Gelfand, Lafayette, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 162 days.

(21) Appl. No.: 10/511,387

(22) PCT Filed: Apr. 10, 2003

(86) PCT No.: PCT/US03/11207
§ 371 (c)(1),
(2), (4) Date: Oct. 15, 2004

(87) PCT Pub. No.: WO03/090389
PCT Pub. Date: Oct. 30, 2003

(65) Prior Publication Data
US 2005/0129107 A1 Jun. 16, 2005

Related U.S. Application Data (60) Provisional application No. 60/373,205, filed on Apr. 17, 2002.

(51) Int. Cl.
*H03H 7/30* (2006.01)
(52) U.S. Cl. .................................................. 375/233
(58) Field of Classification Search ................ 375/229, 375/231, 232, 233, 265, 350
See application file for complete search history.

(56) References Cited

U.S. PATENT DOCUMENTS

| | | | |
|---|---|---|---|
| 5,787,118 A * | 7/1998 | Ueda | 375/232 |
| 6,266,350 B1 | 7/2001 | Ojard et al. | |
| 6,327,709 B1 | 12/2001 | Ovadia et al. | |
| 6,347,391 B1 | 2/2002 | Uesugi et al. | |
| 6,356,586 B1 | 3/2002 | Krishnamoorthy et al. | |
| 6,823,489 B1 * | 11/2004 | Wittig et al. | 714/792 |
| 2002/0154247 A1 * | 10/2002 | Ghosh et al. | 348/614 |
| 2002/0172275 A1 * | 11/2002 | Birru | 375/233 |
| 2003/0099289 A1 * | 5/2003 | Birru | 375/233 |

OTHER PUBLICATIONS
Copy of Search Report dated Jun. 10, 2003.

* cited by examiner

*Primary Examiner*—Emmanuel Bayard
(74) *Attorney, Agent, or Firm*—Joseph J. Laks; Ronald H. Kurdyla; Joseph J. Opalach (57) ABSTRACT

An apparatus for automatically selecting one of a standard decision directed mode and a soft dd mode in a decision feedback equalizer for receiving a data signal includes an equalizer utilizing forward error correction for providing first and second output signals corresponding to a DFE automatic switching mode and a soft automatic switching mode, respectively, and a comparator for comparing byte error rates of the first and second output signals for selecting as a superior mode that mode associated with a lower ByER and outputting the output signal with the lower ByER. A lock detector provides a lock signal derived from the DFE output signal with the lower ByER and a mode switch selectively places the DFE outputs in one of the dd modes or a blind mode, depending on the lock signal.

25 Claims, 4 Drawing Sheets

EQUALIZER/FORWARD ERROR CORRECTION AUTOMATIC MODE SELECTOR

This application claims the benefit, under 35 U.S.C. § 365 of International Application PCT/US03/11207, filed Apr. 10, 2003, which was published in accordance with PCT Article 21(2) on Oct. 30, 2003 in English and which claims the benefit of U.S. Provisional Patent Application No. 60/373, 205, filed Apr. 17, 2002.

Reference is also hereby made to copending U.S. Provisional Patent Application No. 60/372,970, entitled ARCHITECTURE FOR A DECISION FEEDBACK EQUALIZER and filed in the names of the present inventors Heo, Markman, Park and Gelfand on Apr. 16, 2002 and whereof the benefit of priority is hereby claimed and whereof the disclosure is herein incorporated by reference.

BACKGROUND OF THE INVENTION

1. Field of the Invention

The present invention relates generally to adaptive equalizers, which may be used to compensate for signal transmission by way of a channel having unknown and/or time-varying characteristics such as may occur in high definition television reception and, more particularly, relates to an equalizer/forward error correction (FEC) automatic mode selector.

2. Background of the Invention

In the Advanced Television Systems Committee (ATSC) standard for High Definition Television (HDTV) in the United States, the equalizer is an adaptive filter which receives a data stream transmitted by vestigial sideband modulation (VSB), VSB being the modulation system in accordance with the ATSC-HDTV standard, at an average rate equal to the symbol rate of approximately 10.76 MHz. The equalizer attempts to remove or reduce linear distortions mainly caused by multipath propagation, which are a typical characteristic of the terrestrial broadcast channel. See United States Advanced Television Systems Committee, "ATSC Digital Television Standard," Sep. 16, 1995.

Decision Feedback Equalizers (DFE's) as used in the communications art generally include a feedforward filter (FFF) and a feedback filter (FBF), wherein typically the FBF is driven by decisions on the output of the signal detector, and the filter coefficients can be adjusted to adapt to the desired characteristics to reduce the undesired distortion effects. Adaptation may typically take place by transmission of a "training sequence" during a synchronization interval in the signal or it may be by a "blind algorithm" using property restoral techniques of the transmitted signal. Typically, the equalizer has a certain number of taps in each of its filters, depending on such factors as the multipath delay spread to be equalized, and where the tap spacings "T" are generally, but not always, at the symbol rate. An important parameter of such filters is the convergence rate, which may be defined as the number of iterations required for convergence to an optimum setting of the equalizer. For a more detailed analysis and discussion of such equalizers, algorithms used, and their application to communications work, reference is made to the technical literature and to text-books such as, for example, "Digital Communications", by John G. Proakis, 2$^{nd}$ edition, McGraw-Hill, New York, 1989; "Wireless Communications" by Theodore S. Rappaport, Prentice Hall PTR, Saddle River, N.J., 1996; and "Principles of Data Transmission" by A. P. Clark, 2$^{nd}$ edition, John Wiley & Sons, New York, 1983.

BRIEF SUMMARY OF THE INVENTION

In accordance with principles of the present invention, mode selector apparatus automatically selects one of a standard automatic switching mode and a soft automatic switching mode in a decision feedback equalizer. The mode selector apparatus is adapted for use in a data signal processing system with equalization and includes an equalizer which provides first and second DFE outputs corresponding to a standard dd mode and a soft dd mode, respectively; and a comparator which compares byte error rates (ByER) of the first and second DFE outputs, selects as a superior mode that mode associated with a lower ByER and outputs the DFE output with the lower ByER.

BRIEF DESCRIPTION OF THE DRAWING

The invention will be more fully understood from the detailed description which follows, in conjunction with the drawings, in which.

DETAILED DESCRIPTION OF THE INVENTION

An equalizer/forward error correction (FEC) automatic mode selector equalizer in accordance with the present invention comprises a T-spaced (where T is the symbol period) DFE (Decision Feedback) equalizer with three available modes: training, blind and decision directed (dd).

Figure 1:
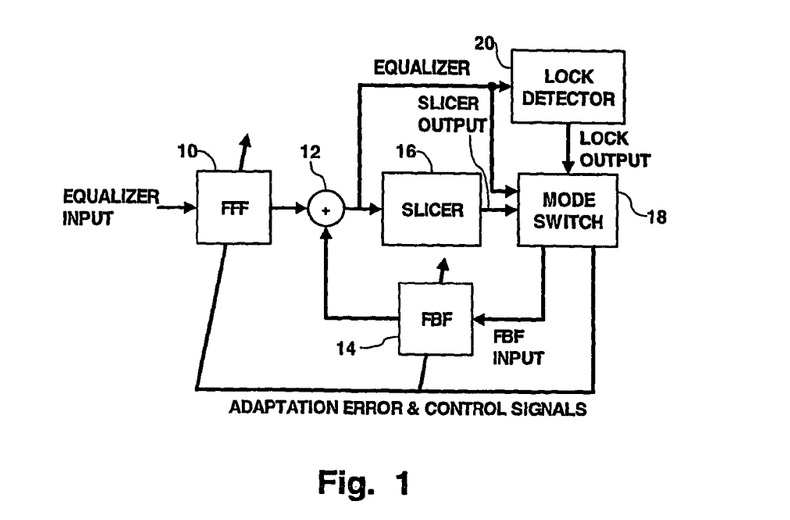
FIG. 1 shows a schematic block diagram of a decision feedback equalizer (DFE) architecture.

Before entering into a detailed description of preferred embodiments of the present invention, it will be helpful to a better understanding of the principles of the present invention and to defining certain terms to consider first a somewhat simplified block diagram of a Decision Feedback Equalizer (DFE) architecture as shown in FIG. 1.

The input to the DFE is coupled to a Feed-Forward Filter (FFF) 10 whose output is coupled to a summation unit 12, the other input to summation unit 12 being coupled to the output of a Feed-Back Filter (FBF) 14. The output of summation unit 12 is coupled to a slicer 16, to an input of a mode switch 18, and to a lock detector 20. The output of lock detector 20 is coupled to a control input of mode switch 18. The output of slicer 16 is coupled to another input of mode switch 18 and an output of mode switch 18 is coupled to an input of FBF 14. Another output of mode switch 18 is coupled to coefficient control inputs of FFF 10 and FBF 14.

The functions of the FFF 10, FBF 14 and slicer 16 are well known and constitute the basic functions of filtering and quantization, respectively. See, for example, the afore-cited text by Proakis. Additional information on filters and their implementation can be found in various textbooks such as, for example, "Digital Signal Processing," by John G. Proakis and Dimitris G. Manolakis, Prentice Hall, New Jersey; 1996 and "Introduction to Digital Signal Processing," by Roman Kuc, McGraw-Hill Book Company, New York; 1988. Lock detector 20 is responsible for the equalizer convergence detection function. It updates the lock detector output by comparing the equalizer output against the slicer levels with a threshold. If the equalizer output and slicer levels are within the threshold distance, a lock or convergence is detected. Mode switch 18 selects the input to the FBF filter as well as the error and control signals to be used in the equalizer adaptation, according to the equalizer mode of choice. It also checks the lock detector output. In normal operation, mode switch 18 has an automatic switching capability, which depends on the output of equalizer lock detector 20. Mode switch 18 interprets the training and blind modes as being used for convergence purposes only. After the equalizer lock detector detects convergence, the equalizer is then transitioned to the decision directed (dd) mode. If convergence is lost, the equalizer goes back to training or blind mode.

In the Advanced Television Systems Committee (ATSC) standard, a training sequence was included in the field sync to allow for initial 1 equalizer convergence. In training mode, the equalizer coefficients are only updated during the field sync. However, two main drawbacks associated with its use are that it requires prior correct detection of the field sync and that the training sequence is contained in the field sync, which only occurs approximately every 25 milliseconds (ms), possibly resulting in slow convergence.

For ghost environments that make it difficult to detect a field sync or with a dynamic component, it is of interest to have an initial adjustment of the equalizer tap coefficients independent of a training sequence, that is, self-recovering or blind. See, for example the above cited text by Proakis and the paper by D. N. Godard, "Self-Recovering Equalization and Carrier Tracking in Two Dimensional Data Communication Systems" IEEE Trans. on Commun., Vol. COM-28, pp. 1867–1875, November 1980.

Furthermore, because it works on every data symbol, the blind algorithm will have a faster convergence.

As is typically the case in the conventional dd mode, the input to FBF 14 is the output of slicer 16. Thus, in the dd mode, the adaptation error and the input to the feedback filter are aided by the presence of a slicer, and coefficient adaptation takes place throughout the data sequence. This mode does not have good convergence capabilities, but after convergence, it has advantages over the other two modes. The advantage of dd mode with respect to blind mode is attributable to the presence of the slicer, resulting in better MSE (mean squared error) and BER (bit error rate) performance at the equalizer output. With respect to the training mode, the fact that dd updates its tap on every symbol, as opposed to training symbols only, allows for faster adaptation and tracking capabilities.

It is herein recognized that the use of blind and dd modes as an aid or as alternative approaches to the training mode are desirable because, inter alia, the training mode in the ATSC-HDTV standard has a slow convergence, as well as poor dynamic tracking capabilities.

In what follows, reference is made to an HDTV receiver and to some of its components and it may be helpful to briefly mention their context. In such a receiver, the adaptive channel equalizer is typically followed by a phase tracking network for removing phase and gain noise from which the signal goes to a trellis decoder followed by a data de-interleaver. The signal is then Reed-Solomon error corrected and then descrambled after which it undergoes audio, video, and display processing. Further details may be found in the technical literature such as, for example, the handbook "Digital Television Fundamentals", by Michael Robin and Michel Poulin, McGraw-Hill, New York; second edition, 2000.

Figure 2:
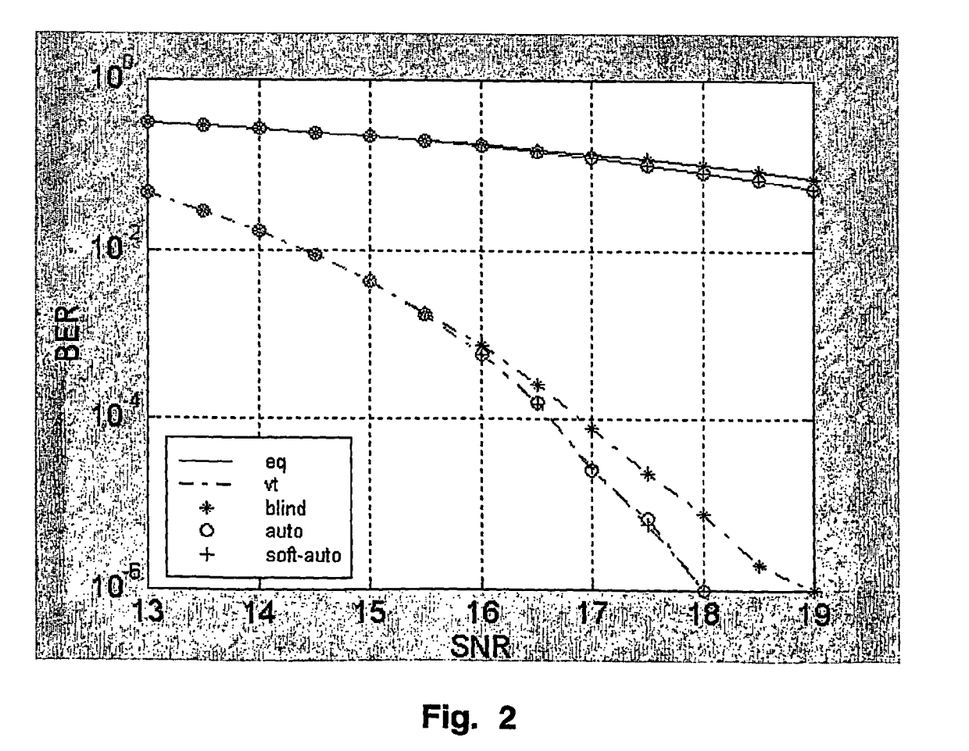
FIG. 2 shows bit error rate (BER) versus signal to noise ratio (SNR) in dB for an equalizer and Viterbi decoder in the additive white Gaussian noise (AWGN) channel.

FIG. 2 shows a graph of BER (Bit Error Rate) vs. SNR (Signal-to-Noise Ratio) performance curves for the equalizer and Viterbi decoder of an HDTV receiver in the AWGN (Additive White Gaussian Noise) channel. The performance is measured after the equalizer as well as after the Viterbi decoder (VD). The Viterbi decoder follows the equalizer in the receiver design and decodes the first level of FEC (Forward Error Correction), corresponding to a TCM (Trellis Coded Modulation) code.

In FIG. 2, three curves are shown for the equalizer (upper set of curves) as well as VD output (lower set of curves): one for the equalizer in blind mode only, the second for the equalizer in automatic switching mode and the third for the equalizer in soft automatic switching mode. In automatic switching mode, the equalizer is in blind mode prior to convergence, and switches to dd mode after convergence is detected. If convergence is lost, it switches back to blind mode. Soft automatic switching mode is similar to automatic switching mode, except that the dd mode is a soft dd mode. In soft dd mode, the input to the feedback filter is the output of the equalizer, instead of the slicer output.

In view of the characteristics shown in FIG. 2, the following are herein recognized:

(a) The equalizer output performance under automatic mode is equal to or better than under blind mode. For increasing SNR, the automatic switching performance is increasingly better;

(b) The VD output performance reflects the equalizer output performance. Under automatic switching mode, it is equal or better than under blind mode. For increasing SNR, the automatic switching performance is increasingly better.

(c) The automatic switching and soft automatic switching modes present similar performance both at the equalizer output and VD output.

Figure 3:
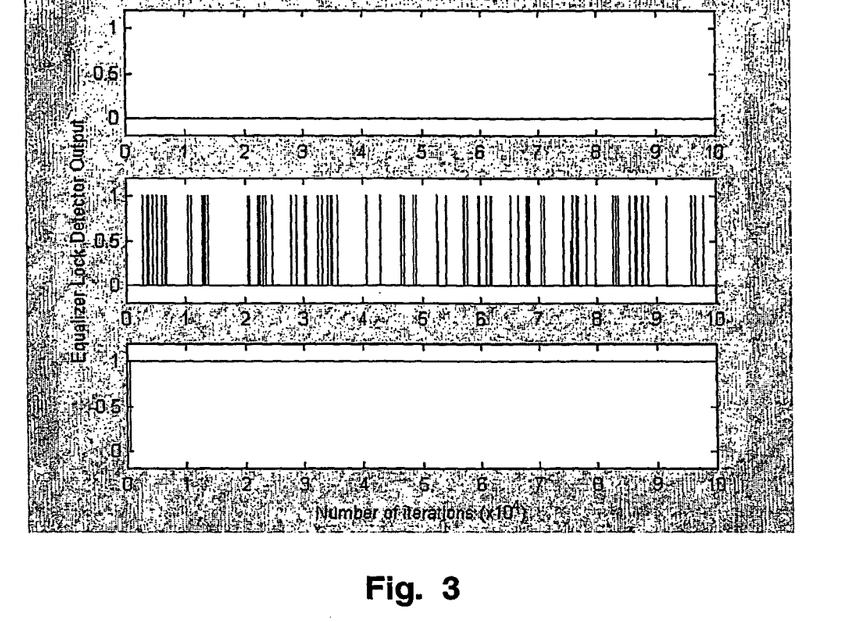
FIG. 3 shows equalizer lock detector output in the AWGN channel and automatic switching mode for different values of SNR.

It is helpful to a better understanding of the relationship between blind and dd mode in automatic switching mode to consider FIG. 3, which shows curves of the equalizer lock detector in the AWGN channel for different SNR values. The SNR is 13 dB in the top graph of FIG. 3, 15 dB in the center, and 18 dB in the bottom graph. In FIG. 3, a 0 level on the ordinate scale indicates that the equalizer is not locked, that is, it is in blind mode. When the equalizer is locked, the lock detector output assumes the value of 1, that is, the equalizer is in dd mode. We observe that for low SNR, the equalizer is mainly in blind mode, that is, convergence is never detected due to the high level of noise. This is an imperfection of the lock detector that generally cannot practicably be overcome. For high SNR, the convergence is eventually detected, and the equalizer is transitioned to dd mode. At a medium SNR, there is constant switching of the lock detector, with noise affecting its ability to detect equalizer convergence besides potentially affecting the equalizer convergence. Similar behavior can be expected for the equalizer in soft automatic switching mode.

Figure 4:
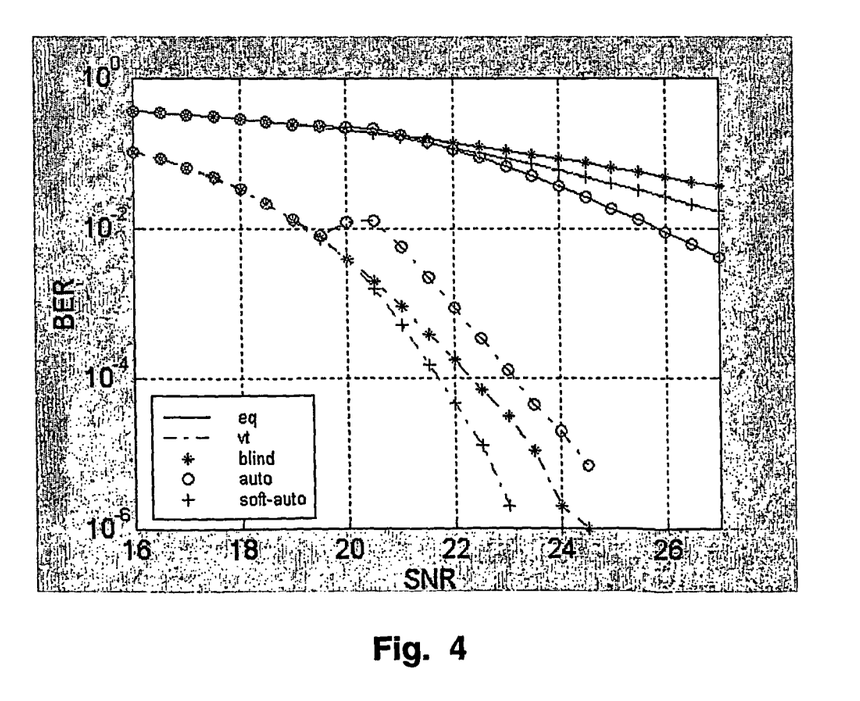
FIG. 4 shows bit error rate (BER) versus signal to noise ratio (SNR) in dB for an equalizer and Viterbi decoder under a 3 dB, 3 microsecond (μs) ghost signal and additive white Gaussian noise (AWGN)

If a multipath signal is now introduced in the channel, some differences in the system simulation may be observed. FIG. 4 shows BER vs. SNR performance curves for the HDTV receiver in the AWGN plus multipath channel. The multipath channel comprises one 3 dB, 3 μsec ghost, which is a relatively strong ghost. As in FIG. 2, the performance is measured after the equalizer (upper set of curves) as well as after the Viterbi decoder (VD) (lower set of curves). Also, three curves are shown for the equalizer as well as for the VD output: one for the equalizer in blind mode only, another for the equalizer in automatic switching mode and the third one for the equalizer in soft automatic switching mode.

In soft automatic switching mode, the equalizer is in blind mode prior to convergence, and switches to soft dd mode after convergence is detected. If convergence is lost, it switches back to blind mode. In soft dd mode, as opposed to the conventional dd mode, the input to the feedback filter is the output of the equalizer.

In view of the characteristics shown in FIG. 4, the following are herein recognized:

(a) Under automatic switching mode the equalizer output performance is equal to or better than in blind mode and in soft automatic switching mode. For increasing SNR, the automatic switching performance is increasingly better.

(b) However, the VD output performance does not reflect the equalizer output performance, especially for medium SNR. For those values of SNR, the VD output performance is worse under automatic switching mode rather than in blind mode and soft automatic switching mode by up to about 1.5 dB.

While it is not apparent from FIG. 4, additional simulations show that for higher SNR values, the VD performance under automatic switching mode will again be better or equal than under blind mode and soft automatic switching mode.

Additional simulations also show that the problem described in item b above becomes more evident for strong ghosts, although still present at a smaller scale for weaker ghosts.

It is helpful to an understanding of the difference in performance behavior between the equalizer and Viterbi decoder when the equalizer is under blind or automatic switching mode, to compute the number of error bursts at the equalizer output under these two modes.

Figure 5:
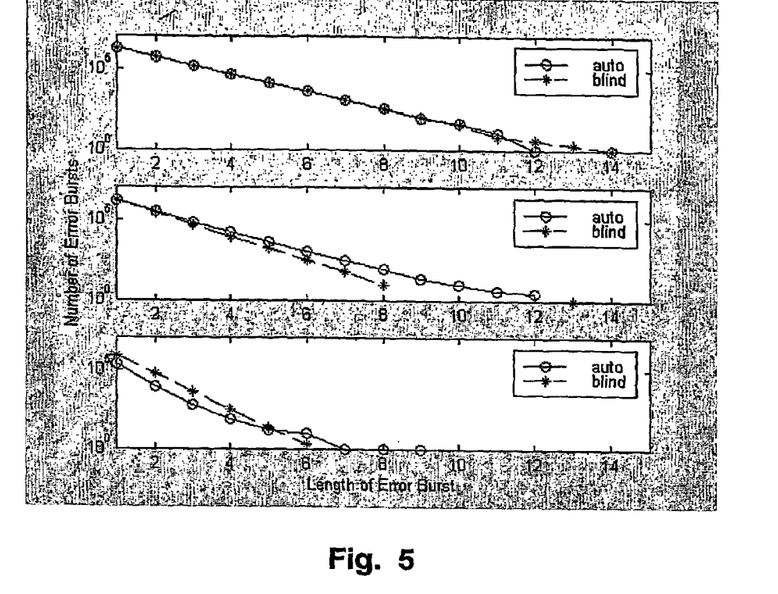
FIG. 5 shows the number of burst errors versus burst size at the equalizer output for blind and automatic switching mode and different SNR measures.

FIG. 5 shows plots for the number of bursts of errors versus the length of the burst under both equalizer modes, and for different SNR measures. The SNR is 18 dB in the top graph of FIG. 5, 21 dB in the center, and 25 dB in the bottom graph. In view of the characteristics shown in FIG. 5, the following are herein recognized:

Under low SNR conditions, the number of errors is very similar for both blind and automatic switching mode. Long error bursts are present in both modes, with a slightly greater number for blind mode;

Under medium SNR conditions, the number of error bursts and error burst length are clearly greater for automatic switching mode as compared with blind mode, as the number of long error bursts under blind mode decreases and automatic switching mode is not affected as much by the increase in SNR; and Under high SNR conditions the number of error bursts and error burst length become greater for blind mode as compared with automatic switching mode, as the number of long error bursts under automatic switching mode now decreases at a faster rate with increasing SNR.

Figure 6:
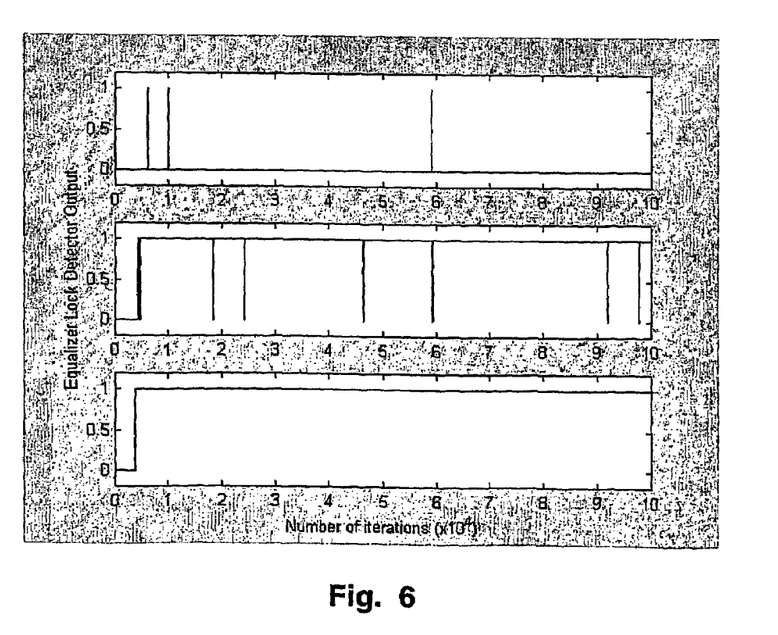
FIG. 6 shows an equalizer lock detector output in the −3 dB, 3 μs plus AWGN channel for different values of SNR.

FIG. 6 shows the equalizer lock detector output against the number of iterations ($\times 10^4$). The SNR is 18 dB in the top graph of FIG. 6, 21 dB in the center, and 25 dB in the bottom graph. The notion of low, medium or high SNR is actually dependent on the ghost profile and strength, since different ghosts imply different performance. However, as shown in FIG. 6, there is a relation between the SNR and the equalizer lock detector performance. As was the case in the AWGN channel, it is observed that for low SNR, the equalizer is mainly in blind mode, that is, convergence is never detected due to the high level of noise. For high SNR, the convergence is eventually detected, and the equalizer is transitioned to dd mode, remaining stable in that mode. At medium SNR, there is constant switching of the lock detector, as the level of noise does not allow for a stable dd mode. Similar behavior can be expected for the equalizer in soft automatic switching mode.

Based on the foregoing considerations and information presented, it is a feature of the present invention to detect these conditions of error propagation for which the standard dd mode delivers a worse performance than the soft dd mode, and to switch the modes. In accordance with the principles of the present invention, the choice of the proper mode is based on the BER at the output of the receiver. In this way, the receiver only switches with certainty, and avoids making the error for channel environments where the soft dd mode would actually deliver a worse performance. Such results were not observed in the present simulations, though this does not a guarantee that this will be the case for all channels.

Figure 7:
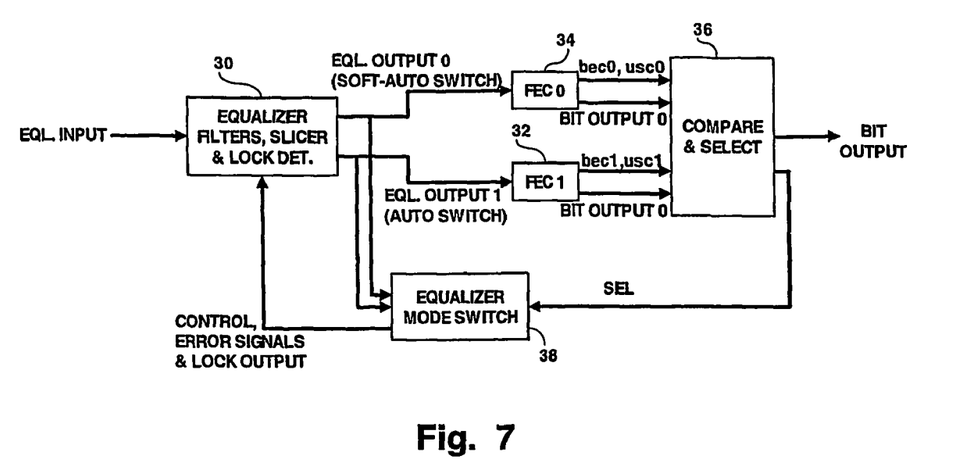
FIG. 7 shows an embodiment of an equalizer/forward error correction (FEC) automatic mode selector in accordance with the present invention.

FIG. 7 shows in block diagram form an exemplary embodiment of an equalizer/forward error correction automatic mode selector in accordance with the present invention, as applied to a HDTV receiver by way of example. FIG. 7 includes the Forward Error Correction (FEC) section of the receiver.

In FIG. 7, a block 30 includes the equalizer, associated filters, slicer, and lock detector(s), as hereinbefore described and explained. Block 30 provides an equalizer output (1) representing automatic switching output to a forward error correction unit 32, indicated as FEC 1. Block 30 also provides an equalizer output (0) representing soft automatic switching to a further forward error correction unit 34, indicated as FEC 0. Block 30 may also include the phase tracking network following the equalizer, or jointly designed with the equalizer as an equalizer/phase tracker unit. The outputs of forward error correction units 32 and 34 are fed to a Compare & Select unit 36, which provides the decoded bit output signal. Compare & Select unit 36 also provides a select signal sel to an equalizer mode switch 38. Mode switch 38 is coupled to receive both equalizer outputs (0) and (1) and for exchanging signals with block 30, as will hereinafter be explained in detail.

In accordance with an aspect of the invention, the FEC section of the receiver is duplicated and the output of the equalizer is delivered for two separate modes: automatic switching and soft automatic switching. The two separate equalizer outputs can be obtained in different ways:

(a) By also duplicating the equalizer hardware; and (b) By a concurrent output equalizer design which permits concurrent outputs as, for example, the equalizer described in the afore-mentioned copending U.S. Provisional Patent Application Ser. No. 60/372,970, entitled DECISION FEEDBACK EQUALIZER, whereof the entire disclosure has been herein incorporated by reference and to which reference is made for a more detailed description.

As disclosed and described in the above-cited provisional patent application, a decision feedback equalizer for processing a data signal provides concurrent equalizer outputs for hard decision directed and soft decision directed modes. The difference between the hard and soft dd modes is associated with the input to the equalizer feedback filter being the output of the slicer (hard decision) or equalizer output (soft decision). The joint architecture takes advantage of the fact that for each equalizer output symbol soft decision bit representation, a subset of these bits corresponds to the hard decision representation. As a result, the equalizer permits the concurrent output of two distinct modes with essentially the same hardware as a one output equalizer.

In FIG. 7, the equalizer filters, slicer and lock detector are as described hereinabove. The equalizer mode switch is also similar to that described above, except that it receives a control signal from the Compare & Select unit. This control signal, sel, identifies which of the two modes (automatic switching or soft automatic switching) has a better performance. It only needs to be fed back to the equalizer mode switch unit in item (b) above for the case of a single equalizer architecture. In this case, it determines which output should be used by the equalizer lock detector to identify a lock condition.

When there is one equalizer with concurrent outputs, one in (hard) automatic switching mode and another in soft automatic switching mode, there is only one lock detector. The Compare & Select unit chooses the best performance system and outputs it. It also feeds back a selector signal to the equalizer mode switch. This selector indicates the best performance system and is used by the lock detector to decide which of the two outputs to check. This selector can also be used to choose which of the two concurrent outputs is fed to the equalizer slicer in order to create the adaptation error as well as choosing which of the FBF coefficient adaptation equations is used in the concurrent output equalizer. As stated above, this equalizer may advantageously utilize the equalizer design described in the afore-mentioned copending U.S. Provisional Patent Application entitled DECISION FEEDBACK EQUALIZER.

In item (a) above, for a dual equalizer architecture, there are two equalizers, and each is a separate entity with a separate lock detector. One equalizer is in (hard) automatic switching mode and the other in soft automatic switching mode. The equalizer mode switch thus essentially comprises two separate systems. In addition to checking the signal sel, the equalizer mode switch also checks on the lock detector output to decide whether the equalizer mode should be blind or (soft) dd. The Compare & Select unit chooses the best performance system and outputs it. No feedback is needed.

The FEC section of the receiver includes the following blocks: Viterbi Decoder (VD), de-interleaver and Reed-Solomon (RS) decoder. In theory, it needs to be duplicated into FEC0 and FEC1, as shown in FIG. 7. However, in general, the RS decoder works at a smaller rate than the symbol rate, since it operates on symbols of several bits. In this case, each RS symbol is a byte, and the rate is slow enough such that the RS decoder hardware can be shared between the two FEC blocks. In addition, the de-interleaver control performs the same operation in both blocks and can be shared. Therefore, the de-interleaver may have the same control as before and twice the memory, where each portion of the memory is equally addressed by the control. It is herein recognized that one could also share VD control sections between the two FEC sections; however, since the VD for the ATSC-HDTV standard is actually a set of 12 interleaved decoders, it is simpler to duplicate the entire unit.

Additional blocks present in the receiver include the derandomizer and the output interface, which need only be included following the Compare & Select unit, but could also be considered part of each FEC unit.

Each FEC section outputs three signals, namely: the output bit, the byte error count at the output of the RS decoder (bec) and the uncorrected segment count at the output of the RS decoder (usc). The bec signal represents the number of byte errors that have been corrected by the RS decoder over a specified window W total number of bytes. The usc signal represents the number of uncorrected segments over a specified window W total number of bytes. In a RS decoder, bec and usc are related to the BER and can be used to estimate the BER. The function of the Compare & Select unit is to compare the bec counts for the two FEC units, every W bytes, or equivalently the usc count.

The Compare & Select unit is an additional element of the Equalizer/FEC mode selector. It basically subtracts bec1 and bec2 and compares it against a threshold Thr. If the absolute value of the subtraction s is below the threshold, then both equalizer outputs are performing at basically the same level, and the correct output is established as the output of unit 0. This output corresponds to the equalizer being set in the automatic switching mode (blind plus dd modes). As a result, the variable set is set to 0, and is fed back to the mode switch to identify the equalizer output 0 as the output on which the equalizer lock detector should operate.

On the other hand, if IsI is greater than or equal to Thr, then both equalizer outputs are performing at different levels. The algorithm then compares bec0 and bec1 and chooses the smaller as the best performance. If s is greater than 0, then bec0 is greater than bec1, the output bit is set to output bit 1, and sel is set to 1 to identify the equalizer output 1 as the output on which the equalizer lock detector should operate. Correspondingly, if s is smaller than or equal to 0, then the output bit 0 is chosen and sel is set to 0. The entire operation of the Compare & Select unit is then repeated for every W bytes. A similar design can be analogously implemented for the usc count.

Figure 8:
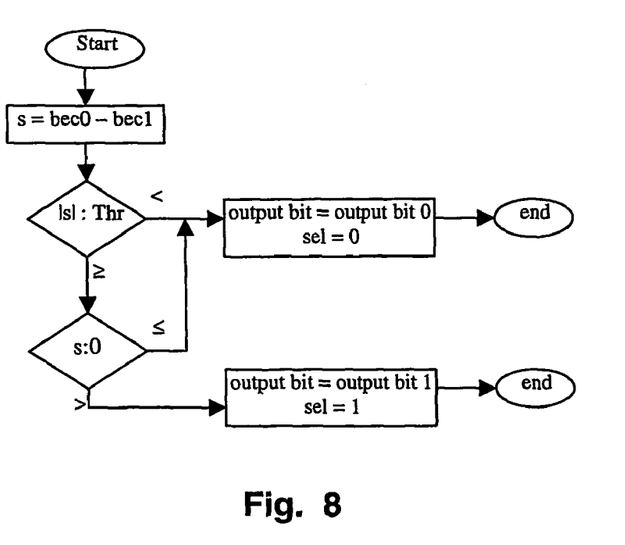
FIG. 8 shows a compare and select unit flow chart in accordance with the present invention.

FIG. 8 shows a Compare & Select unit flowchart for a bec comparison, the symbols used being as defined above.

The equalizer/FEC automatic mode selector has been illustratively described as being designed for the HDTV-ATSC equalizer; however, its principles in accordance with the invention can be applied to any general equalizer with a DFE architecture, in a system where the equalizer is followed by a Trellis or convolutional decoder. For such a system, the error propagation into the DFE filter originated by linear distortion, noise and the slicer presence in dd mode results in bursty type of noise at the equalizer output, which will tend to impair the decoder performance. In addition, although described in the context of a symbol-spaced (T-spaced, where T is the symbol period) equalizer, the invention can also be applied to fractionally spaced equalizers. Fractionally spaced equalizers are described in several textbooks, such as the afore-mentioned "Digital Communications", by John G. Proakis, 2nd edition, McGraw-Hill, New York, 1989. Also, the soft decision directed input to the FBF, although described as the equalizer output, could be a more complex soft decision function of the equalizer output. It should also be understood that the equalizer in FIG. 1 can include the training mode as well. The training mode of operation would be exclusive with respect to the blind mode as in a traditional DFE and would not interfere with the decision directed modes.

It will be understood that the equalizer design providing concurrent equalizer outputs for automatic switching and soft automatic switching modes is used in an exemplary embodiment and in an illustrative manner and that it may be possible to use other arrangements to provide concurrent outputs. Thus, while the present invention has been described by way of exemplary embodiments, it will be recognized and understood by one of skill in the art to which the invention pertains that various changes and substitutions, including the foregoing described variations, may be made without departing from the invention as defined by the claims following.

The invention claimed is:

1. Mode selector apparatus for automatically selecting one of a standard automatic switching mode and a soft automatic switching mode in a decision feedback equalizer (DFE), said mode selector apparatus being adapted for use in a data signal processing system with equalization, said mode selector apparatus comprising:
   an equalizer for providing first and second DFE outputs corresponding to a standard decision directed (dd) mode and a soft dd mode, respectively; and
   a comparator for comparing byte error rates (ByER) of said first and second DFE outputs for selecting as a superior mode that mode associated with a lower ByER and outputting the DFE output with said lower ByER.

2. Mode selector apparatus as recited in claim 1 wherein said standard automatic switching mode selectively exhibiting a blind mode and a standard decision directed mode and said soft automatic switching mode selectively exhibiting a blind mode and a soft dd mode.

3. Mode selector apparatus as recited in claim 2, including lock detector means for providing a lock signal for indicating convergence of said DFE, said lock signal being derived from said DFE output signal with said lower ByER.

4. Mode selector apparatus in accordance with claim 2, wherein said equalizer for providing said first and second DFE output signals comprises decision feedback equalizer means for processing said data signal and exhibiting concurrent soft and hard decision directed output signals.

5. Mode selector apparatus in accordance with claim 3, wherein said lock detector means includes first and second lock detectors for providing respective lock signals derived from respective ones of said DFE outputs.

6. Mode selector apparatus in accordance with claim 3, including a mode switch for selectively placing said DFE outputs in one of
   (a) one of said standard and soft dd modes and
   (b) a blind mode, depending on said lock signal identifying convergence of said DFE.

7. Mode selector apparatus in accordance with claim 3, wherein a training mode replaces the blind mode and including a mode switch for selectively placing said DFE outputs in one of
   (a) one of said standard and soft dd modes and
   (b) a training mode, depending on said lock signal identifying convergence of said DFE.

8. Mode selector apparatus in accordance with claim 1 further comprising:
   a forward error correcting processor for processing said first and second DFE output signals by forward error correction so as to provide respective first and second forward error correction (FEC) output signals; wherein:
   the comparator determines which one of said standard automatic switching mode and said soft automatic switching mode is the superior mode in accordance with a defined comparison criterion, and outputs an output signal of said one superior mode.

9. Mode selector apparatus in accordance with claim 8, wherein said forward error correcting processor includes a trellis decoder and a Reed Solomon (RS) decoder.

10. Mode selector apparatus in accordance with claim 9, wherein said defined comparison criterion comprises said comparator comparing uncorrectable segment rates (USR) out of said RS decoder, selecting as a superior mode that mode associated with a lower USR and outputting the DFE output signal with said lower USR.

11. Mode selector apparatus in accordance with claim 9, wherein said defined comparison criterion comprises said comparator comparing estimated bit error rate out of said RS decoder, selecting as a superior mode that mode associated with a lower ByER and outputting the DFE output signal with said lower ByER.

12. Mode selector apparatus in accordance with claim 1, wherein said equalizer for providing first and second DFE output signals includes equalizer filtering means and slicer means coupled to said mode switch for providing said first and second DFE output signals.

13. Mode selector apparatus in accordance with claim 8, wherein said forward error correcting processor comprises parallel processing means for respectively providing said first and second FEC output signals.

14. Apparatus in accordance with claim 5, including a mode switch coupled to said first and second DFE output signals, said respective lock output signals, and to said comparator for monitoring a comparison signal for selecting one of said respective lock output signals to provide said lock signal, depending upon said comparison signal.

15. Apparatus in accordance with claim 14, wherein said mode switch selects one of said respective lock output signals corresponding to said superior mode.

16. A method for automatically selecting one of a standard automatic switching mode and a soft automatic switching mode in a decision feedback equalizer (DFE) for receiving a data signal, said method comprising the steps of:
   processing a received signal, including equalization and forward error correction (FEC);
   providing first and second DFE output signals corresponding to said standard automatic switching mode and said soft automatic switching mode, respectively;
   processing said first and second DFE output signals so as to provide respective first and second FEC output signals;
   comparing byte error rates (ByER) in each of said first and second FEC output signals to ascertain which of said automatic switching mode and said soft automatic switching mode is a superior mode for ByER under given conditions;
   deriving a selection signal from said superior mode; and
   utilizing said selection signal for controlling said DFE.

17. A method in accordance with claim 16, wherein said step of utilizing said selection signal for controlling said DFE comprises a step of setting said DFE into one of
   (a) a blind mode, and
   (b) one of a standard decision directed mode and a soft decision directed mode, depending on said selection signal.

18. A method in accordance with claim 17, wherein said step for providing first and second DFE output signals includes:

a step of equalizer filtering; and a step of signal slicing coupled for providing said first and second DFE output signals.

19. A method in accordance with claim 17, wherein said step of processing said first and second DFE output signals comprises a step of processing said first and second DFE output signals in parallel paths for respectively providing said first and second FEC output signals.

20. A method in accordance with claim 17, wherein said step of FEC processing includes steps of trellis decoding and Reed Solomon decoding.

21. A method in accordance with claim 16, wherein said step of utilizing said selection signal for controlling said DFE comprises:

deriving a first lock signal from said first FEC output signal;

deriving a second lock signal from said second FEC output signal; and selecting one of said first and second lock signals for controlling said DFE, depending on said selection signal.

22. A method in accordance with claim 19, wherein said step of processing said first and second DFE output signals comprises a step of processing said data signal by a decision feedback equalizer exhibiting concurrent soft and hard decision directed operating modes for providing said first and second DFE output signals.

23. A method in accordance with claim 22, including providing concurrently in each output symbol soft decision bit representation concurrently both hard and soft decision representations.

24. A method in accordance with claim 16, wherein said step of utilizing said selection signal for controlling said DFE comprises:

deriving a lock signal from one of said first and second FEC output signal, depending on said selection signal; and utilizing said lock signal for controlling said DFE.

25. A method in accordance with claim 16, wherein said step of utilizing said selection signal for controlling said DFE comprises:

deriving a lock signal from that one of said first and second FEC output signal associated with said superior mode.

* * * * *

UNITED STATES PATENT AND TRADEMARK OFFICE
CERTIFICATE OF CORRECTION

| | | |
|---|---|---|
| PATENT NO. | : 7,158,568 B2 | Page 1 of 1 |
| APPLICATION NO. | : 10/511387 | |
| DATED | : January 2, 2007 | |
| INVENTOR(S) | : Jeongsoon Park et al. | |

It is certified that error appears in the above-identified patent and that said Letters Patent is hereby corrected as shown below:

Title page
Item 75, please correct the Inventor's name "Markman Ivonete" to --Ivonete Markman--.

Signed and Sealed this

Tenth Day of April, 2007

JON W. DUDAS
*Director of the United States Patent and Trademark Office*